United States Patent [19]

Smierciak et al.

[11] Patent Number: 5,596,058

[45] Date of Patent: Jan. 21, 1997

[54] PROCESS FOR MAKING AN ACRYLOINITRILE/METHACRYLONITRILE COPOLYMER

[75] Inventors: Richard C. Smierciak, Aurora; Eddie Wardlow, Jr., Shaker Hts.; Lawrence E. Ball, Akron, all of Ohio

[73] Assignee: The Standard Oil Company, Cleveland, Ohio

[21] Appl. No.: 539,664

[22] Filed: Oct. 5, 1995

Related U.S. Application Data

[63] Continuation of Ser. No. 331,297, Oct. 28, 1994, abandoned, which is a continuation of Ser. No. 149,880, Nov. 10, 1993, abandoned.

[51] Int. Cl.$^6$ .................................................... C08F 220/44
[52] U.S. Cl. .................................................................. 526/342
[58] Field of Search ............................................... 526/342

[56] References Cited

U.S. PATENT DOCUMENTS

| | | | |
|---|---|---|---|
| 2,692,875 | 10/1954 | Weinstock, Jr. et al. | 260/85.5 |
| 3,565,876 | 2/1971 | Ball et al. | 260/85.5 |
| 5,106,925 | 4/1992 | Curatolo et al. | 526/342 |

*Primary Examiner*—Joseph L. Schofer
*Assistant Examiner*—N. Sarofim
*Attorney, Agent, or Firm*—David J. Untener; Michael F. Esposito; Teresan W. Gilbert

[57] ABSTRACT

A process for making acrylonitrile/methacrylonitrile copolymer, comprising polymerizing a mixture of acrylonitrile monomer and methacrylonitrile monomer in which the rate of addition of the comonomers is set by the rate of polymerization so that the concentration of unreacted acrylonitrile monomer and unreacted methacrylonitrile monomer is low and the polymerization process is in a starved condition.

21 Claims, No Drawings

PROCESS FOR MAKING AN ACRYLOINITRILE/METHACRYLONITRILE COPOLYMER

This is a continuation of application Ser. No. 08/331,297, filed on Oct. 28, 1994, now abandoned, which is a file wrapper continuation of U.S. Ser. No. 08/149,880, filed on Nov. 10, 1993, now abandoned.

RELATED APPLICATION

This patent application is related to patent application entitled "A Process For Making Acrylonitrile Monomer, Methacrylonitrile Monomer and Other Olefinically Unsaturated Monomers", U.S. Ser. No. 08/543,230, filed Oct. 13, 1995, which is a continuation of No. 08/333,943, filed Nov. 3, 1994, now abandoned which is a continuation of No. 08/150,515, filed Nov. 10, 1993, now abandoned, and filed the same date as this patent application.

BACKGROUND OF THE INVENTION

1. Field of the Invention

The present invention relates to a process for producing homogeneous acrylonitrile/methacrylonitrile copolymers that are melt processable. More specifically, the invention relates to a monomer starved process for producing acrylonitrile/methacrylonitrile copolymers in which the polymerization rate exceeds or equals the addition rate of the comonomers of acrylonitrile and methacrylonitrile.

2. Description of the Prior Art

Acrylic polymers are desirable to produce fibrous textiles, films, molded objects, packaging applications, and the like because the acrylic polymers contain mostly nitrile polymers. Nitrile polymers have excellent barrier properties, chemical resistance, rigidity, heat resistance, UV resistance, moisture retention, and bacteria resistance. Acrylonitrile and methacrylonitrile monomers are nitrile monomers useful to produce acrylic polymers.

In the past, acrylic polymers containing greater than about 20% by weight polymerized acrylonitrile were not melt processable. U.S. Pat. No. 3,565,876 discloses that up to about 20% by weight of an acrylonitrile monomer can be copolymerized with a methacrylonitrile monomer to form an extrudable copolymer which can be readily oriented and possesses excellent physical properties. Increasing the acrylonitrile content above about 20% by weight in the acrylonitrile/methacrylonitrile copolymer results in a resin which is thermally unstable and not processable by any standard economical commercial melt processing techniques including extrusion. Accordingly, other non-nitrile monomers have been added to the acrylic polymers to make the acrylic polymers melt processable. High acrylic polymers are commonly processed by solvent techniques such as wet spinning acrylic fibers. The use of solvents is disadvantageous because the solvents must be removed from the acrylic polymer prior to end use resulting in voids in the acrylic polymer. Furthermore, the solvents are typically toxic and their disposal has negative environmental implications.

U.S. Pat. No. 5,106,925 discloses a process for producing an acrylonitrile/methacrylonitrile copolymer that is melt processable in the absence of solvent. In the patent the acrylonitrile/methacrylonitrile copolymer is produced under flooded monomer process conditions. In the flooded monomer process, the molar weight ratios of the comonomers of acrylonitrile and methacrylonitrile must be carefully controlled and adjusted throughout the polymerization process in relationship to the conversion of polymer. The polymer conversion is tracked throughout the process so that the addition of the comonomers may be adjusted to obtain the desired polymer. Thus, this process is disadvantageous because of the necessity to track, to predict the polymer conversion rate, and to adjust the rate of addition of the comonomers throughout the process.

It is advantageous to produce acrylonitrile/methacrylonitrile copolymers by a process in which the comonomer feed ratio is fixed throughout the polymerization process. Further, it is desirable to produce homogeneous acrylonitrile/methacrylonitrile copolymers with excellent barrier properties and thermoplastic properties which copolymers are melt processable in the absence of a solvent.

SUMMARY OF THE INVENTION

The present invention provides a new and improved process for producing acrylonitrile/methacrylonitrile copolymers with excellent barrier properties and thermoplastic properties. The process comprises polymerizing a mixture of acrylonitrile monomer and methacrylonitrile monomer, in which the rate of addition of the acrylonitrile monomer and the methacrylonitrile monomer is set to be less than or equal to the rate of polymerization to maintain a monomer starved process. Further, the weight of unreacted (hereinafter "free") acrylonitrile monomer and unreacted (hereinafter "free") methacrylonitrile monomer is not greater than 15% of the weight of the polymerizing mixture. Further, the comonomer molar ratio of acrylonitrile and methacrylonitrile is fixed and constant for the comonomer mixture throughout the polymerization process.

In particular, the process for polymerizing comonomers of acrylonitrile and methacrylonitrile to produce an acrylonitrile/methacrylonitrile copolymer comprises the steps of;

1. heating an initial comonomer mixture comprising acrylonitrile monomer and methacrylonitrile monomer under an inert atmosphere in the range of about 40° C. to about 120° C.,
2. adding an initiator to the initial comonomer mixture to start a polymerization reaction, and
3. adding a comonomer feed mixture comprising acrylonitrile monomer and methacrylonitrile monomer to the polymerizing mixture wherein the comonomer feed mixture has a fixed and constant molar ratio of acrylonitrile monomer to methacrylonitrile monomer and further wherein the addition rate of the comonomer feed mixture is less than or equal to the polymerization rate.

The process of the present invention produces homogeneous acrylonitrile/methacrylonitrile copolymers in which the units of acrylonitrile and methacrylonitrile are interdispersed randomly throughout the polymerized chain in relative small monomer units resulting in a melt processable "all nitrile" copolymer. The acrylonitrile/methacrylonitrile copolymer is melt processable in the absence of solvent or plasticizing agent to produce acrylic products.

DETAILED DESCRIPTION OF THE INVENTION

The present invention relates to a process for producing melt processable homogeneous acrylonitrile/methacrylonitrile copolymers.

The new and improved process for producing melt processable copolymers of acrylonitrile and methacrylonitrile is accomplished by controlling the rate of addition of the acrylonitrile monomer and methacrylonitrile monomer relative to the rate of polymerization. The process of the invention is a monomer starved process in which the polymerization reaction rate exceeds or equals the comonomers addition rate. The low concentration of comonomers during the addition step prevents long sequences of acrylonitrile monomer in the copolymer. The copolymers contain small sequences of methacrylonitrile interdispersed between small sequences of acrylonitrile, for example AN-AN-MAN-AN-AN-MAN-MAN, allowing for melt processability of the acrylonitrile/methacrylonitrile copolymer in the absence of solvent. The rate of addition of the acrylonitrile monomer and the methacrylonitrile monomer is continuous or incremental, preferably continuous. The molar ratio of comonomer feed mixture of acrylonitrile monomer and methacrylonitrile monomer is constant throughout the process. The process produces a homogeneous composition of copolymer similar to the molar ratio of the incoming comonomer feed mixture.

In the practice of the present invention the polymerization process is carried out as an emulsion, a solution, a suspension or in bulk. Preferably, the polymerization process is carried out as an emulsion or a suspension. The present invention can be practiced as a semi-batch or continuous process.

Initially, acrylonitrile monomer and methacrylonitrile monomer is contacted in an aqueous medium at about 0.1% by weight to about 15% by weight of the total polymerization reaction media. The initial comonomer mixture contains about 99% by weight to about 20% by weight acrylonitrile monomer and about 1% by weight to about 80% by weight methacrylonitrile monomer. Preferably, the initial comonomer mixture is richer in acrylonitrile monomer than the comonomer feed mixture because the acrylontrile monomer is more soluble in the aqueous medium than is the methacrylonitrile monomer.

The aqueous medium contains water and a suitable surfactant such as an emulsifier or a dispersing agent. The surfactants and their use are known to those skilled in the art.

A molecular weight modifier may be added to the initial comonomer mixture in the range of about 0% by weight to about 5% by weight of total comonomer mixture. Preferably, about 0.1% by weight to about 4% by weight of the total comonomer mixture. Most preferably, about 0.5% by weight to about 3% by weight of the total comonomer mixture.

The initial comonomer mixture is placed into a reaction container containing aqueous medium. The reaction container with the aqueous medium has been purged with an inert gas, such as nitrogen, argon, and the like. Preferably, but optionally, the inert gas purge is continued throughout the polymerization reaction. The initial comonomer mixture is then heated to a temperature in the range of about 40° C. to about 120° C., preferably about 50° C. to about 95° C. and most preferably about 65° C. to about 75° C. The temperature of the polymerization reaction is maintained throughout the polymerization process in the range of about 40° C. to about 120° C., preferably, about 50° C. to about 95° C. and most preferably about 65° C. to about 75° C.

An initiator is added to the heated initial comonomer mixture to start the acrylonitrile/methacrylonitrile polymerization reaction. The initiator added to the reaction container is generally in the range of about 0.01% by weight to about 5% by weight of the total comonomer mixture.

Simultaneously, after or preferably immediately after the polymerization reaction has been initiated a comonomer feed mixture of acrylonitrile monomer and methacrylonitrile monomer is incrementally or continuously, preferably continuous, added to the heated initial comonomer mixture in the reaction container. The combined weight of free acrylonitrile monomer and free methacrylonitrile monomer present in the polymerizing mixture, at anytime, is not greater than about 15% by weight, preferably not greater than about 10% by weight and most preferably not greater than 5% by weight the polymerizing mixture.

The comonomer feed mixture contains about 95% by weight to about 20% by weight acrylonitrile monomer and about 5% by weight to about 80% by weight methacrylonitrile monomer. The molar ratio of the acrylonitrile monomer to methacrylonitrile monomer, in the comonomer feed mixture, is fixed and constant throughout the polymerization process resulting in a homogeneous copolymer. The molar ratio of acrylonitrile monomer to methacrylonitrile monomer depends on the desired acrylonitrile/methacrylonitrile copolymer composition.

A molecular weight modifier is optionally added to the polymerization mixture. Preferably, a molecular weight modifier is employed in the polymerization mixture. The molecular weight modifier is added continuously or incrementally to the polymerization mixture. Preferably, the molecular weight modifier is added continuously to the polymerization mixture. The molecular weight modifier is preferably added to the comonomer feed mixture in the range of about 0% by weight to about 5% by weight, preferably about 0.1% by weight to about 4% by weight and most preferably about 0.5% by weight to about 3% by weight total comonomer mixture.

The molecular weight modifier includes but is not limited to mercaptans, alcohols, halogen compounds, or any other chain transfer agent known to those skilled in the art. Mercaptans are the preferred molecular weight modifier. The mercaptans include but are not limited to $C_5$ to $C_{18}$ alkyl mercaptans whether straight chained, branched, substituted or unsubstituted, d-limonene dimercaptan, dipentene dimercaptan, and the like. The preferred mercaptans are the $C_5$ to $C_{12}$ alkyl mercaptans whether straight chained, branched, substituted or unsubstituted such as n-dodecyl mercaptan, and octyl mercaptan. The molecular weight modifier can be employed singularly or in combination. The molecular weight modifier can be the same or a different molecular weight modifier as is employed with the initial comonomer mixture.

The molecular weight modifier controls the molecular weight of the polymerized acrylonitrile/methacrylonitrile copolymer chain by terminating the length of the growing chain. The molecular weight modifier useful in the present invention produces an acrylonitrile/methacrylonitrile copolymer with a molecular weight in the range of about 15,000 molecular weight to about 500,000 molecular weight.

The initiator is added continuously or incrementally to the polymerization mixture. Preferably, the initiator is added continuously. The initiator is added at a rate to maintain the polymerization rate, which rate can be determined by one skilled in the art. The concentration of the initiator is generally in the range of about 0.01% by weight to about 5% by weight of the total comonomer mixture.

The initiator is any free radical initiator known to those skilled in the art. The initiator includes but is not limited to azo compounds, peroxides, hydroperoxides, alkyl peroxides, peroxydicarbonates, peroxyesters, dialkyl peroxides, persulfates, perphosphates, and the like. Persulfates are the preferred initiators. The initiator can be employed singularly or in combination. The initiator can be the same or a different initiator as is employed to start the polymerization reaction.

The polymerization mixture is continuously or intermittently agitated by any known method, such as stirring, shaking, and the like. Preferably, the polymerization mixture is continuously agitated.

The reaction is continued until polymerization has proceeded to the desired extent, generally from about 40% to about 99% conversion, preferably from about 70% to about 95% conversion.

The polymerization reaction is stopped by cooling, adding an inhibitor such as diethyl hydroxylamine, 4-methoxylphenol and the like, discontinuing the comonomer feed and the like. The inhibitors and their use are known to those skilled in the art.

It will be readily apparent to one skilled in the art that the acrylonitrile/methacrylonitrile copolymers may be further modified by the addition of lubricants, dyes, leaching agents, plasticizers, pseudoplasticizers, pigments, delustering agents, stabilizers, static agents, antioxidants, reinforcing agents such as fillers, and the like. It is understood that any additive possessing the ability to function in such a manner can be used as long as it does not have a major deleteriously affect on the melt characteristics and barrier properties of the copolymer.

At the conclusion of the polymerization reaction the acrylonitrile/methacrylonitrile copolymers are isolated as a slurry, or a latex. Any known technique may be used to isolate the acrylonitrile/methacrylonitrile copolymers as a powder such as crumb coagulation, spraying the solution of copolymer into a heated and/or evacuated chamber to remove the water vapors, stripping, filtration, centrifugation, and the like.

The acrylonitrile/methacrylonitrile copolymers produced by the process of the instant invention are nitrile polymers containing acrylonitrile and methacrylonitrile. The copolymers comprise about 20% by weight to about 95% by weight polymerized acrylonitrile and about 5% by weight to about 80% by weight polymerized methacrylonitrile.

The acrylonitrile/methacrylonitrile copolymers are melt processable and may be further processed by spinning, molding, extruding and the like without the use of solvents or other monomers. The acrylonitrile/methacrylonitrile copolymers possess excellent physical and thermal properties and can be readily oriented. Further, the acrylonitrile/methacrylonitrile copolymers may be utilized in numerous applications such as for use as fibers, sheets, films, pipes, tubings, molded articles, and the like.

SPECIFIC EMBODIMENTS

The following example demonstrates the process and advantages of the present invention.

Equipment

A 2 liter circulating hot water jacketed reactor was equipped with a reflux condenser, a thermocouple/controller, paddle agitation at about 230 rpm, an argon purge tube (continuous), and monomer feed pump. Comonomer feed mixture and ammonium persulfate initiator aqueous solution are metered by Masterflex Microprocessor controlled feed pumps.

Components

The overall polymerization components are as follows:

| Component | Parts | Grams (gms) |
|---|---|---|
| Water | 300 | 1260 |
| Gafac RE-610 | 3.0 | 12.6 |
| Acrylonitrile | 58.1 | 244.0 |
| Methacrylonitrile | 41.9 | 176.0 |
| N-octyl mercaptan | 2.0 | 8.4 |
| Ammonium persulfate | 0.63 | 2.646 |
| Totals: | 405.63 | 1703.65 |

Procedure:

The reactor was pre-charged with water and Gafac surfactant which had been pre-dissolved at about 50° C. with stirring. The reactor was then heated to about 70° C. with continuous argon purging. The initial comonomer mixture contains about 2.1 gm of n-octyl mercaptan was added to the reactor at a fixed 95/5 weight ratio of acrylonitrile to methacrylonitrile. About 0.882 gm of ammonium persulfate initiator was added to the reactor to initiate the polymerization reaction.

The comonomer feed mixture contains about 6.3 gms of the n-octyl mercaptan was continuously pumped into the reactor at a constant, fixed 54/46 weight ratio of acrylonitrile monomer to methacrylonitrile monomer. Simultaneously, about 1.764 gms of the ammonium persulfate was pumped into the reactor as about a 100 ml total volume aqueous solution. Both the comonomer feed mixture stream and the initiator stream were fed into the reactor as separate streams. Total polymerization reaction time was about 6 hours.

After the polymerization reaction was completed the resulting copolymer emulsion was filtered through a piece of pre-weighed cheesecloth to collect and separate any coagulum. The coagulum is bundled in the cheesecloth and rinsed with warm tap water. The cheesecloth is dried overnight at about 60° C. Then the dried cheesecloth/coagulum is weighed. The coagulum was about 0.1% by weight of comonomers.

About 2500 g. of distilled water containing about 14.8 g. of alum was heated to about 75° C. in a stainless steel beaker with continuous stirring. The filtered copolymer emulsion was poured into the hot alum solution while stirring to coagulate the copolymer as crumb. The copolymer crumb was separated by hot filtration and then washed with about 2 to about 3 liters of distilled water. The washed copolymer crumb was dried on a filter overnight. The copolymer crumb was then washed by stirring in about 2 to about 3 liters of absolute methanol and soaked overnight. The copolymer crumb was then filtered, and dried for about 3 to about 24 hours on a funnel. The copolymer was then dried in a fluidized bed dryer at about 55° C. for about 3 hours.

TESTING

Molecular Weight:

The molecular weight (MW) of a copolymer was determined by Gel Permeation Chromatography (GPC) in dimethyl formamide solvent and calibrated with polystyrene standards. This is a known standard method.

NMR Analysis:

Samples for NMR Analysis were prepared using DMSO-D6 as solvent. Compositions were determined using $^1H$ spectra and sequence distributions were determined using $^{13}C$ spectra. $^1H$ spectra were obtained using a Varian Gemini 300 Spectrometer at 300 MHz and/or a Varian VXR-400 Spectrometer at 400 MHz. $^{13}C$ spectra were obtained using a Varian Gemini 300 Spectrometer at 75.5 MHz and/or a Varian VXR-400 Spectrometer at 100.7 MHz. The numerical data is presented in Table I wherein A=Acrylonitrile Unit and M=Methacrylonitrile Unit.

Brabender Plasticorder:

The Brabender plasticorder, available from C.W. Brabender Instruments Inc., South Hackensack, N.J., is a low shear melt mixing device that measures the torque (metergrams m-g) required to melt stir a molten polymer. The test determines whether a polymer may be melted and processed employing standard thermoplastic equipment. The Brabender analyses were run at about 200° C. with torque readings taken at about 5 minute intervals to about 30 minutes. This method measures polymer degradation as a function of time, temperature, and physical abrading. The numerical data is presented in Table II.

Results:

The results were very uniform for the homogeneous acrylonitrile/methacrylonitrile copolymers produced by the process described herein. The final conversion to copolymer was about 88% based on total comonomer.

The weight average molecular weight of the copolymer was about 49,000±2,000. Polydispersity, or ratio between weight average molecular weight to number average molecular weight was about 2.4.

The desired copolymer composition was 54/46 acrylonitrile/methacrylonitrile by weight. NMR data demonstrated that the sequencing in the copolymer of the acrylonitrile monomer and methacrylonitrile monomer was interdispersed and had a high degree of randomness.

TABLE I

| Composition | | Sequencing | | | | | |
| --- | --- | --- | --- | --- | --- | --- | --- |
| Acrylonitrile (%) | Methacrylonitrile (%) | MMM | MMA | AMA | MAM | MAA | AAA |
| 53.1% | 46.9% | 15.9 | 46.1 | 38.0 | 20.7 | 45.2 | 34.1 |

The Brabender torque data is a function of time at about 200° C. The Brabender torque data demonstrates that in the range of about 1000 to about 2000 m-g the copolymer is easily melt processable for about 30 minutes at about 200° C. The Brabender torque data demonostrates good thermal stability of the copolymer which further indicates a high degree of monomer randomness in the structure of the copolymer. The Brabender torque data is shown in Table II below:

TABLE II

| Time at 200° C. (min) | Torque (m − g) |
| --- | --- |
| 0 | 0 |
| 5 | 1151 |
| 10 | 940 |
| 15 | 1182 |
| 20 | 1427 |
| 25 | 1635 |
| 30 | 1920 |

From the above descriptions of the invention, those skilled in the art will perceive improvements, changes and modifications in the invention. Such improvements, changes and modifications within the skill of the art are intended to be covered by the appended claims.

What is claimed:

1. A process for polymerizing monomers of acrylonitrile and methacrylonitrile to produce an acrylonitrile/methacrylonitrile copolymer, said process comprising the steps of:

heating an initial comonomer mixture comprising acrylonitrile monomer and methacrylonitrile monomer under an inert atmosphere in the range of about 40° C. to about 120° C.;

adding an initiator to the initial comonomer mixture to start a polymerization reaction;

adding a comonomer feed mixture comprising acrylonitrile monomer and methacrylonitrile monomer to a polymerization mixture wherein the comonomer feed mixture is added at a fixed and constant molar ratio of acrylonitrile monomer to methacrylonitrile monomer and at a constant rate which is less than the rate at which the monomers are converted into copolymer and wherein the monomers of unreacted acrylonitrile and unreacted methacrylonitrile in the polymerization mixture are not greater than 15% of the total weight of the polymerization mixture; resulting in a homogeneous acrylonitrile/methacrylonitrile copolymer product wherein the copolymer product ratio is similar to the comonomer feed ratio and wherein the copolymer is melt processable without the use of solvents.

2. The process of claim 1 wherein the combined weight of unreacted acrylonitrile monomer and unreacted methacrylonitrile monomer present in the polymerizing mixture at any time is not greater than 15% by weight of the polymerizing mixture.

3. The process of claim 1 wherin the combined weight of unreacted acrylonitrile monomer and unreacted methacrylonitrile monomer present in the polymerizing mixture at any time is not greater than 10% by weight of the polymerizing mixture.

4. The process of claim 1 wherin the combined weight of unreacted acrylonitrile monomer and unreacted methacrylonitrile monomer present in the polymerizing mixture at any time is not greater than 5% by weight of the polymerizing mixture.

5. The process of claim 1 wherein a molecular weight modifier is added to the initial comonomer mixture, the comonomer feed mixture and to both mixtures.

6. The process of claim 5 wherein the molecular weight modifier is added to the initial comonomer mixture in the range of about 0% by weight to about 5% by weight of the total reaction comonomer.

7. The process of claim 5 wherein the molecular weight modifier is added to the comonomer feed mixture in the range of about 0% by weight to about 5% by weight of the total reaction comonomer.

8. The process of claim 5 wherein the molecular weight modifier is selected from the group consisting of mercaptans, alcohols, halogen compounds and combinations thereof.

9. The process of claim 8 wherein the molecular weight modifier is a mercaptan selected from the group consisting of $C_5$ to $C_{18}$ alkyl mercaptans which are straight chained, branched, substituted, unsubstituted and combinations thereof.

10. The process of claim 9 wherein the alkyl mercaptan has an alkyl group having from 5 to 12 carbon atoms.

11. The process of claim 8 wherein the mercaptan is selected from the group consisting of n-dodecyl mercaptan, octyl mercaptan, and combinations thereof.

12. The process of claim 1 wherein the initial comonomer mixture is heated to about 65° C. to about 75° C.

13. The process of claim 1 wherein the initiator is added to the initial reaction mixture in the range of 0.01% by weight to about 5% by weight of total comonomer mixture.

14. The process of claim 13 wherein the initiator is selected from the group consisting of azo compounds, peroxides, hydroperoxides, alkyl peroxides, peroxydicarbonates, peroxyesters, dialkyl peroxides, persulfates, perphosphates, and combinations thereof.

15. The process of claim 1 further comprising the step of adding an initiator continuously to the polymerization reaction media.

16. The process of claim 15 wherein the initiator is added continuously to the polymerization reaction media at about 0.01% by weight to about 5% by weight of the total comonomer mixture and is further selected from the group consisting of azo compounds, peroxides, hydroperoxides, alkyl peroxides, peroxydicarbonates, peroxyesters, dialkyl peroxides, persulfates, perphosphates, and combinations thereof.

17. The process of claim 1 wherein the initial comonomer mixture contains about 99% by weight to about 20% by weight acrylonitrile monomer and about 1% by weight to about 80% by weight methacrylonitrile monomer.

18. The process of claim 1 wherein the comonomer feed mixture contains about 95% by weight to about 20% by weight acrylonitrile monomer and about 5% by weight to about 80% by weight methacrylonitrile monomer.

19. The process of claim 1 wherein said process is carried out as an emulsion, a solution, a suspension or in bulk.

20. The acrylonitrile/methacrylonitrile copolymer produced by the process of claim 1 wherein the copolymer is about 20% by weight to about 95% by weight polymerized acrylonitrile and about 5% by weight to about 80% by weight polymerized methacrylonitrile.

21. A process for polymerizing monomers of acrylonitrile and methacrylonitrile to produce an acrylonitrile/methacrylonitrile copolymer, said process comprising the steps of:

heating an initial comonomer mixture comprising acrylonitrile monomer and methacrylonitrile monomer under an inert atmosphere in the range of about 40° C. to about 120° C.;

adding an initiator to the initial comonomer mixture to start a polymerization reaction;

adding a comonomer feed mixture comprising acrylonitrile monomer and methacrylonitrile monomer to a polymerization mixture wherein the comonomer feed mixture is added at a fixed and constant molar ratio of acrylonitrile monomer to methacrylonitrile monomer and at a constant rate which is less than the polymerization reaction rate without tracking the conversion of monomer into copolymer and wherein the monomers of unreacted acrylonitrile and unreacted methacrylonitrile in the polymerization mixture are not greater than 15% of the total weight of the polymerization mixture; resulting in a homogeneous acrylonitrile/methacrylonitrile copolymer product wherein the copolymer product ratio is similar to the comonomer feed ratio and wherein the copolymer is melt processable without the use of solvents.

* * * * *